United States Patent [19]
Cooper

[11] 3,985,652
[45] Oct. 12, 1976

[54] DUAL COAXIAL BIDIRECTIONAL VALVES AND FILTER ASSEMBLIES AND HYDROSTAT SYSTEMS CONTAINING THE SAME

[75] Inventor: Roydon B. Cooper, Locust Valley, N.Y.

[73] Assignee: Pall Corporation, Glen Cove, N.Y.

[22] Filed: Oct. 31, 1974

[21] Appl. No.: 519,732

Related U.S. Application Data
[63] Continuation-in-part of Ser. No. 356,231, May 1, 1973, Pat. No. 3,908,693.

[52] U.S. Cl. .............................. 210/97; 210/168; 210/420; 210/428
[51] Int. Cl.² ........................................ B01D 29/36
[58] Field of Search ............... 210/97, 98, 108, 167, 210/168, 417, 420, 424, 428

[56] References Cited
UNITED STATES PATENTS

| | | |
|---|---|---|
| 2,423,329 | 7/1947 | Le Clair .......................... 210/168 X |
| 2,460,058 | 1/1949 | Brodeur .......................... 210/167 X |
| 2,649,688 | 8/1953 | Slomer ............................. 210/97 X |
| 3,222,866 | 12/1965 | Lehmann ........................ 210/167 X |
| 3,289,841 | 12/1966 | Quinting ........................ 210/42 C X |

*Primary Examiner*—John Adee

[57] ABSTRACT

Dual coaxial bidirectional valves are provided for use in fluid systems such as hydrostat systems where flow can proceed in opposite directions, and which direct flow through a unidirectional or multidirectional function such as a filter assembly in such a system in the normal direction, regardless of the direction of flow in the system. The valve includes two opposed coaxial valves intercepting and controlling flow through a box junction of the fluid line with the lines leading to and from the filter assembly, in a manner such that, regardless of the direction of flow in the fluid line, flow proceeds in the same direction in the connecting fluid lines to and from the function.

13 Claims, 8 Drawing Figures

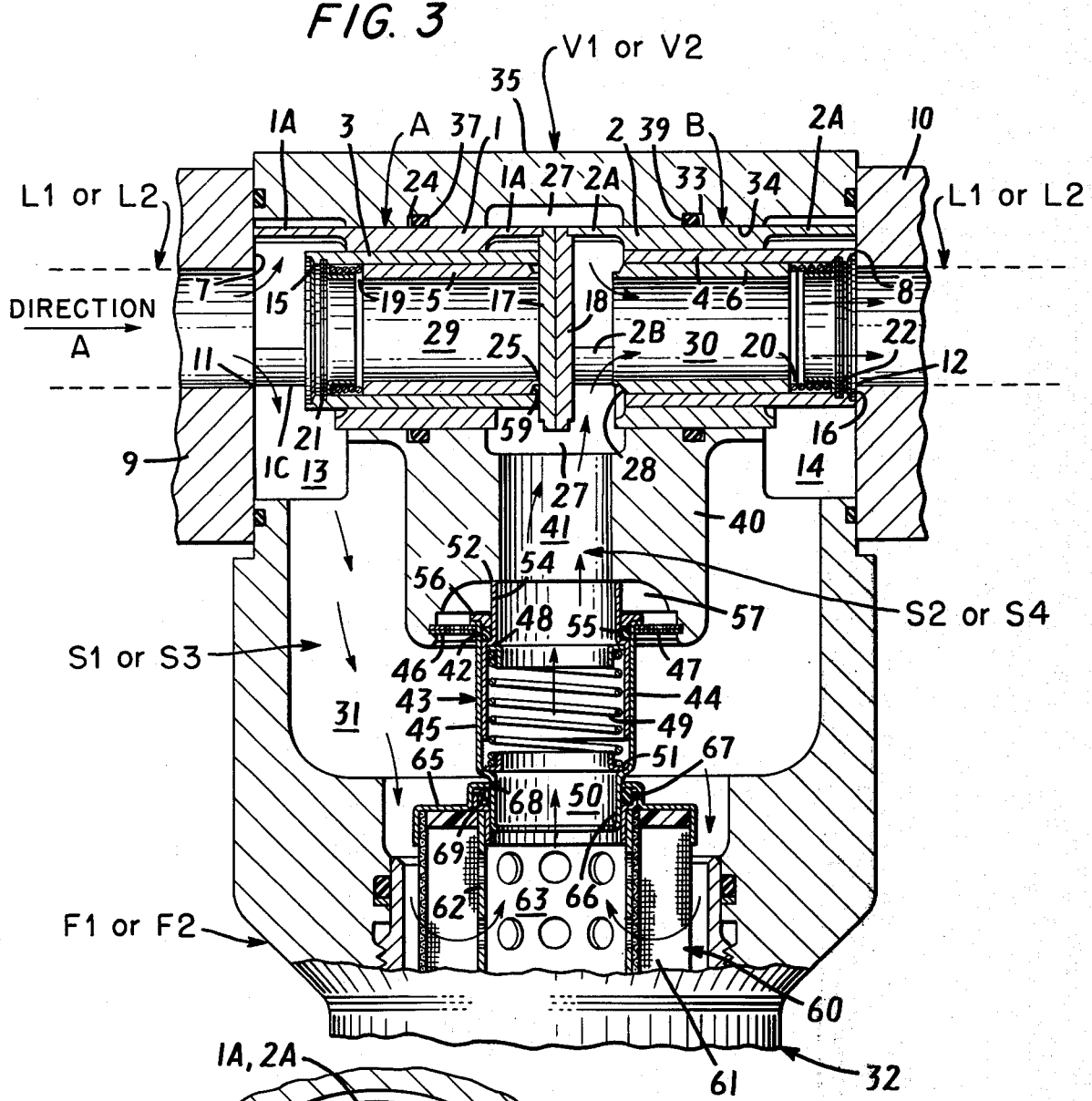
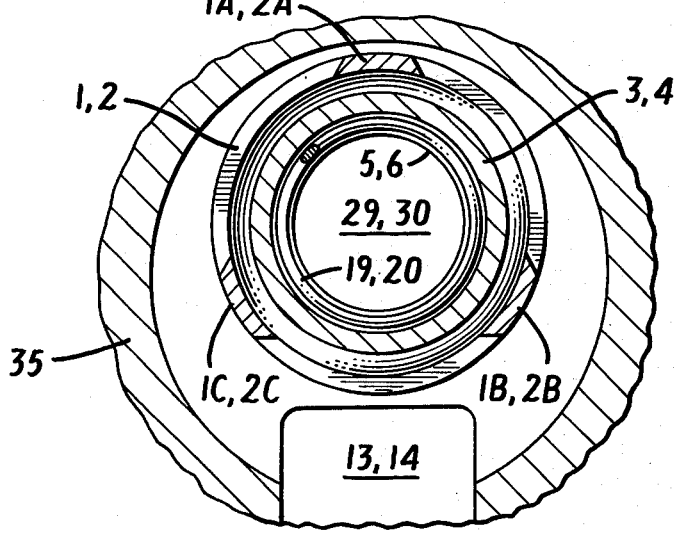

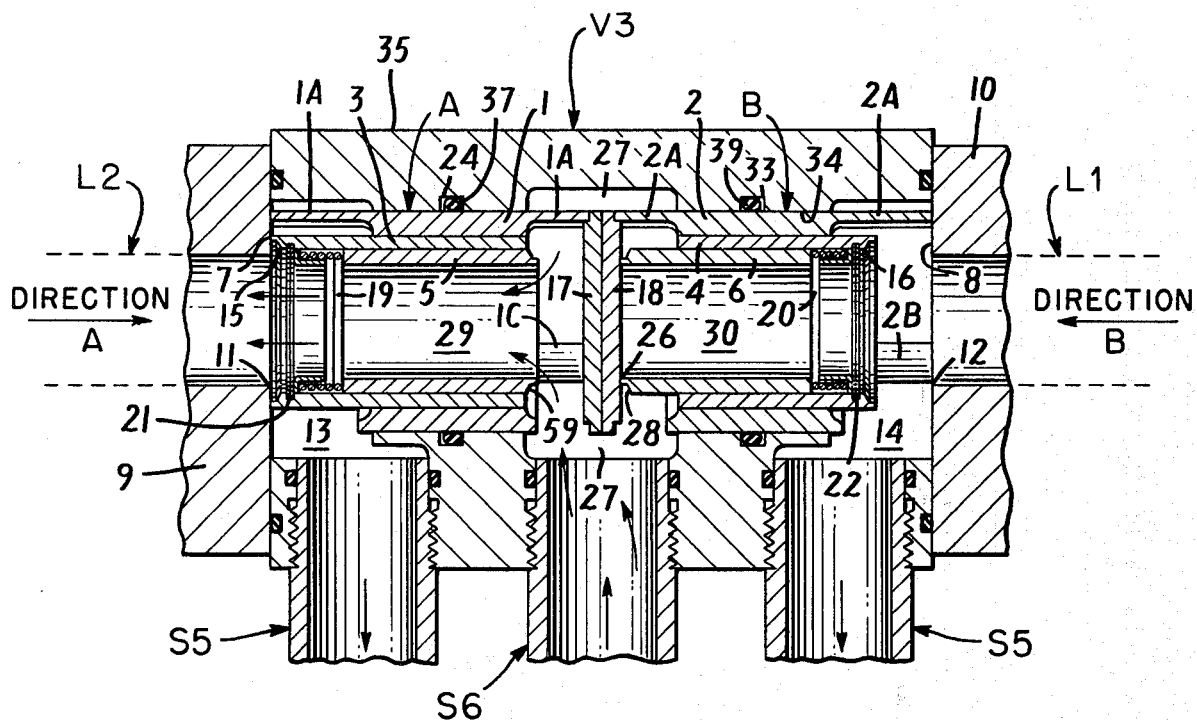
FIG. 5
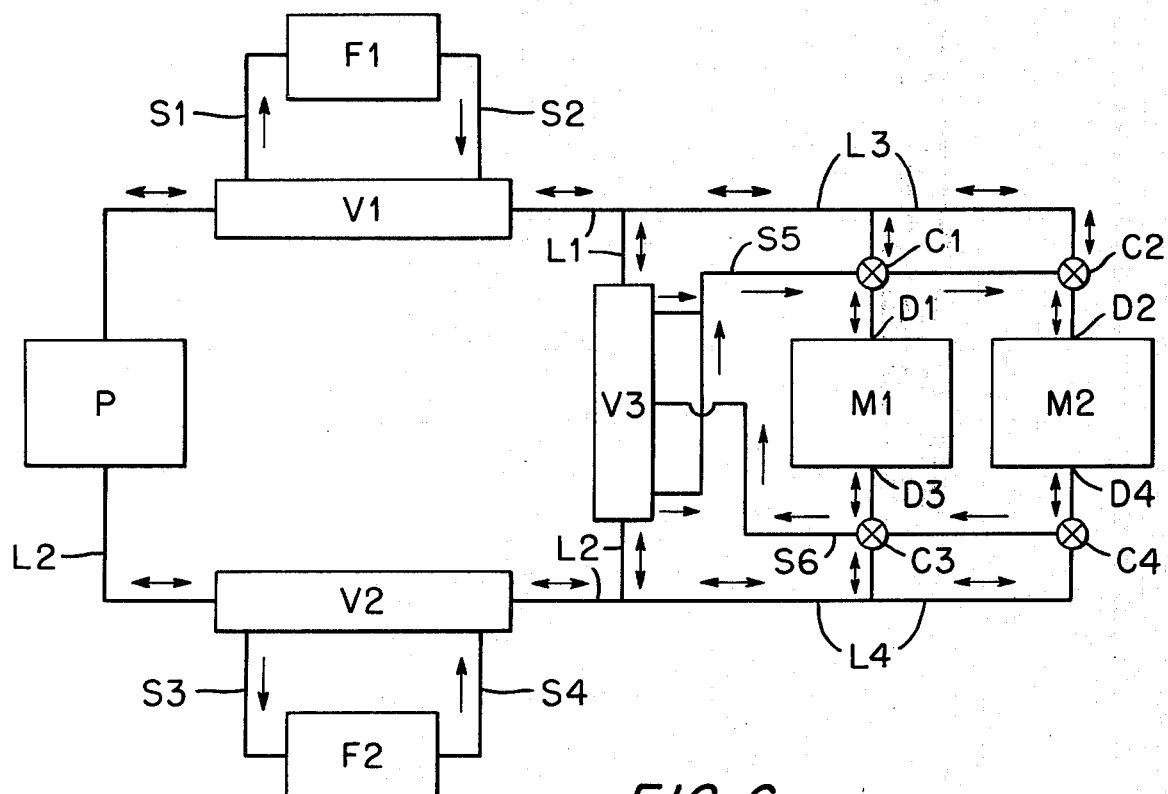
FIG. C

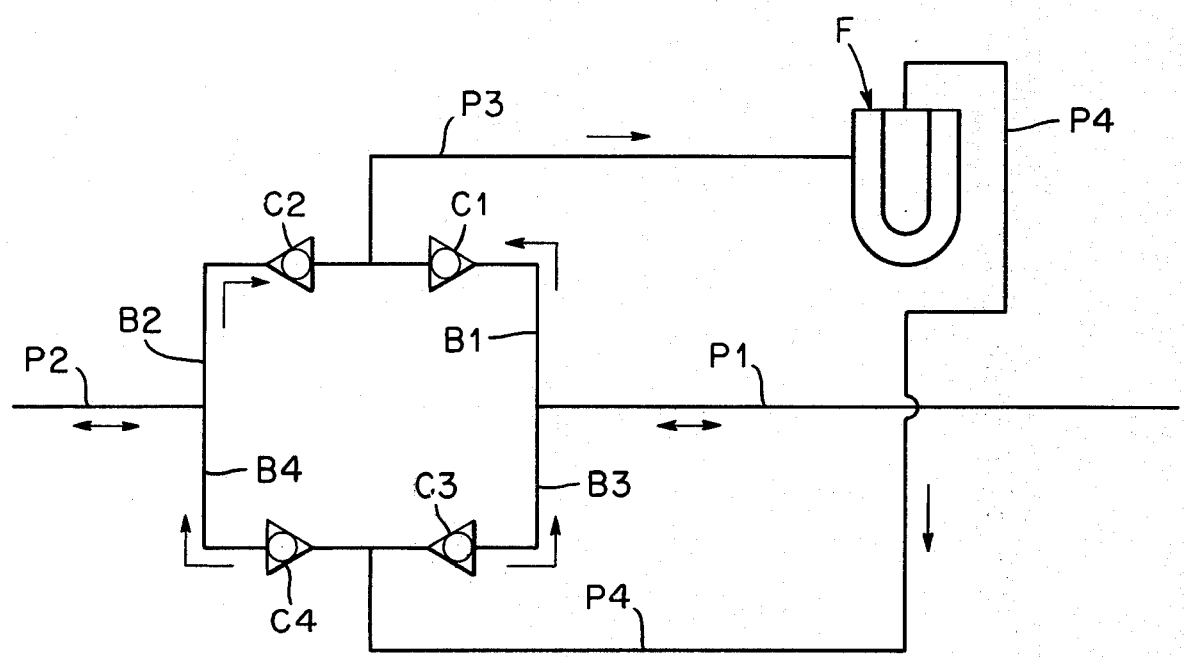
*FIG. A*
PRIOR ART
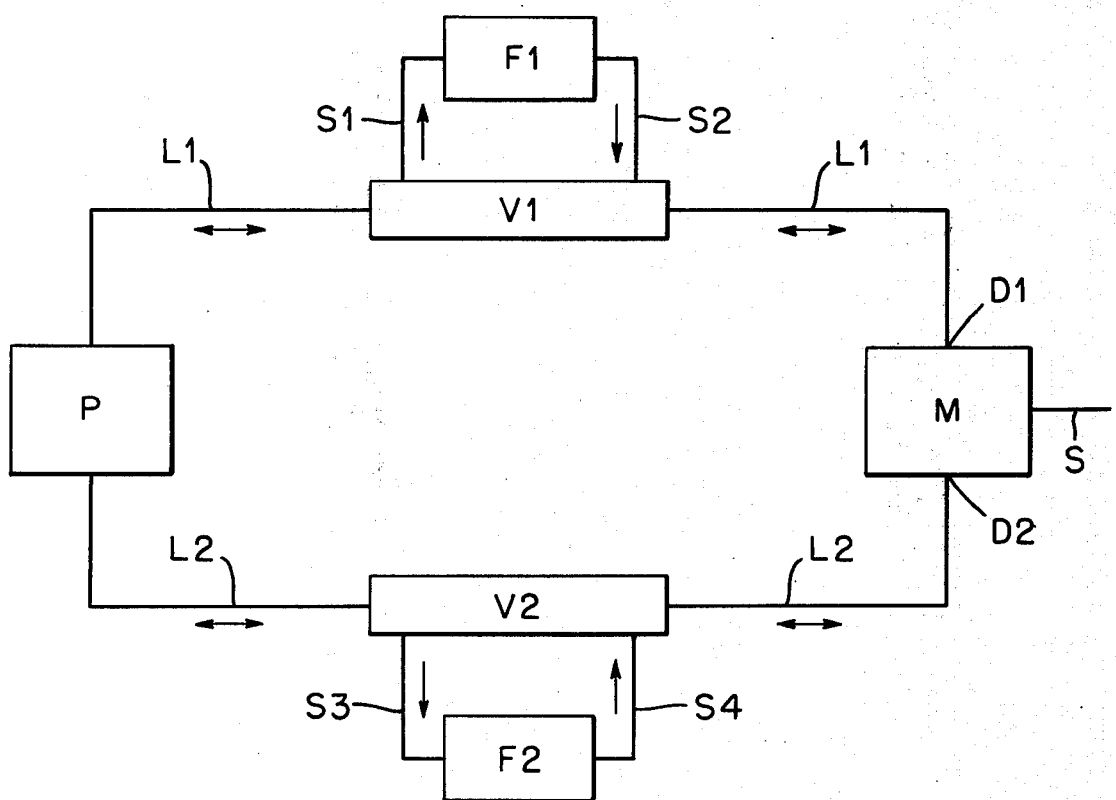
*FIG. B*

DUAL COAXIAL BIDIRECTIONAL VALVES AND FILTER ASSEMBLIES AND HYDROSTAT SYSTEMS CONTAINING THE SAME

This application is a continuation-in-part of Ser. No. 356,231, filed May 1, 1973, now U.S. Pat. No. 3,908,693 issued Sept. 30, 1975.

Hydrostat systems are composed of a hydraulic pump and a hydraulic motor coupled together in a closed fluid flow loop or circuit to provide a fluid drive for vehicles and to operate light and heavy-duty machinery, such as tractors and earth-moving equipment and paper mill machinery. The pump operates the motor by pumping the fluid to the motor which returns the fluid to the pump, and the motor in turn rotates an axle or other rotating member to drive the vehicle or machinery.

Operation in either direction can be obtained in the same system by control of the direction of flow of fluid through the system, and the side of the motor to which the fluid is pumped. Fluid entering the motor from a first direction drives the motor in one direction, while fluid entering the motor from a second direction drives the motor in the opposite direction. The motor thus can drive the vehicle or machinery in either direction, according to the direction of flow of the fluid from the pump to the motor.

The fluid flow between the pump and the motor is normally in a closed circuit through either of two fluid paths, one path being followed for clockwise operation and the other path being followed for counterclockwise operation, and the fluid paths enter opposite sides of the motor so as to drive it clockwise or counterclockwise, for operation in one direction or the other, which may be forward or reverse.

The fluid paths are in a closed flow loop or circuit of the type shown in FIG. B, and each path carries forward or reverse flow, according to the direction of flow through the system required for the desired operation.

The terms "clockwise" and "counterclockwise" are applied herein to the direction of operation of the fluid drive; clockwise or righthand flow operates the drive in one direction, and counterclockwise or lefthand flow operates the drive in the opposite direction.

The terms "forward" and "reverse" are herein applied to the direction of flow of fluid through a given fluid path of the system between the pump and the motor. Forward flow is from the pump to the motor, and reverse flow is from the motor to the pump in the same fluid path.

Flow through a unidirectional function in the functioning direction is referred to as "normal" flow. The valve of the invention ensures that flow in the system in either direction enters the unidirectional function in the same and normal direction.

It is thus seen that forward is applied to the direction of flow in the fluid path coincides with and refers to the flow direction required for either clockwise or counterclockwise operation.

Because the system operates the drive by fluid flow, and because the wear of the moving parts tends to introduce foreign particles, bits of metal and other debris into the hydraulic fluid circulating through the system, it is customary to provide a filter in each fluid path, to filter the fluid, and thus clean the fluid from any particles which might damage the moving parts of the motor and pump. The filter is usually interposed to clean the fluid during forward flow from the pump to the motor. The filter can also be interposed to filter the fluid during flow from the motor to the pump. Provision for normal flow through the filter to filter flow in either flow direction in the system ensures that only clean fluid is supplied to the motor and the pump.

In such systems, therefore, it is desirable to provide for flow through the filter element in either direction of flow in the system. In this situation, it is necessary to ensure that the flow through the filter proceeds in the same or normal direction, whether or not the fluid flow through the system is in forward or in reverse flow. Otherwise, on reverse flow the contaminants on the opposite of the filter are unloaded and returned to the stream.

This can be accomplished by a combination of four check valves in a four-branch flow circuit providing a box junction intercepting the two fluid lines, which enter the box junction at opposite sides and at a 90° angle to each other. The check valves permit flow only in one direction in each branch of the box.

Such a box junction circuit is shown in FIG. A having four check valves C1, C2, C3, C4, one in each of the four branches of the box junction. If the symbol

be understood as representing a check valve with free flow from left to right and zero flow from right to left, then it will be apparent that if flow is inward at P1, it progresses via the right branch B1 through the check valve C1 into the line P3 leading to the filter assembly F and thence via line P4 and the left branch B4 through check valve C4 to the line P2. If the flow is inward at line P2, it proceeds via the left branch B2 through the check valve C2 to line P3, and again to the filter assembly in the same direction, and thence through line P4 via the right branch B3 and check valve C3 to line P1.

The principle of utilizing a box junction in this manner has been known for many years, but it is not widely used because the conventional check values required with associated piping for the box junction are costly, offer a very high pressure drop, and occupy a large amount of space. Consequently, in the usual hydrostat system one is normally content to interpose the filter so as to clean flow during one direction but not the other.

If the filter is arranged in this way, however, the system requires some means for controlling reverse flow so that it does not pass through the filter. Therefore, it is customary to provide a bidirectional valve in the hydrostat system, which under forward flow directs fluid through one path by way of the filter, and under reverse flow directs fluid through another path bypassing the filter.

The design of a bidirectional valve that will meet the pressure and rapid flow reversal requirements of modern hydrostat systems has posed numerous problems, and the bidirectional valves heretofore available have not been fully satisfactory in meeting the requirements. Many such systems require a high speed of reversal of the drive, within from 40 to 50 milliseconds. The bidirectional valves that have been used are not capable of responding so quickly, and consequently there is a time lag in the reversing, which is undesirable.

Another difficulty posed by hydrostat systems which must be met by bidirectional valves is the necessity of passing full flow in either direction immediately, to avoid starvation of the motor and/or pump. This poses a design problem in any valve which is responsive to a differential fluid pressure across the valve. The usual design of valve, such as the ball-and-poppet and the Belleville washer, is responsive to a sufficient fluid pressure differential across the valve to provide a large valve opening at a high differential pressure, and a lesser valve opening at a lower differential pressure. Once the valve has opened a little, the pressure differential across the valve decreases, with the result that it becomes impossible to open the valve any further. The larger the flow required, the larger the valve element that is needed to expose a large opening, and this increases the differential pressure required to open the valve. Moreover, the larger the valve, the larger the mass of material which has to be put in motion to open the valve. For these reasons, the design of a bidirectional valve that is capable of operating in a confined space, has a low mass, and opens quickly to provide for full flow immediately upon change of flow direction, has proved to be a complex and perplexing problem.

The result of these difficulties has been an inability to resolve the problems posed by a box junction provided with check valves and to provide a hydraulic system which is capable of providing for flow in the same direction through a filter element regardless of the flow direction through a fluid line or system, such as a hydrostat system.

In accordance with the invention, a dual coaxial bidirectional flow-control valve is provided, responsive to flow from either direction by way of pressure-actuating surfaces to open when flow begins from either direction, and to close when flow stops. The valve is especially designed for use in the fluid lines of hydrostat systems and other systems where bidirectional flow can be encountered. The valve is arranged to direct flow from either direction in the fluid line in which it is interposed to a function, such as a filter element, through one path, and from the function, such as a filter element, through another path returning it to the fluid line for flow in either direction from the valve.

Thus, the valve combines in a single unit a box junction of the type shown in FIG. A, and is responsive to fluid flow in either direction through a fluid line P1, P2, to direct fluid flow in the same direction through line P3 to the filter element and line P4 from the filter element, and then back to the fluid line.

The dual valve comprises first and second coaxial tubular valves, each with first and second tubular valve elements reciprocating between open and closed positions along a longitudinal axis. The two valves are linked in their response to fluid flow, so that when one of the first and second tubular valve elements of the first valve is open, for flow in one direction, one of the first and second tubular valve elements of the second valve is also open, for flow through the combined valves in the same direction, and the other tubular valve elements of each valve are closed. Similarly, when the other of the tubular valve elements of the second valve is open for flow in the other direction, the other of the tubular valve elements of the first valve is also open, for flow through the combined valves in the other direction, and the one tubular valve elements of each valve are closed.

One of the tubular valve elements of each of the first and second valves controls flow to the line leading to one side of the function, such as a filter element, and the other of the tubular valve elements of the first and second valves controls flow from the line leading from the other side of the function, such as a filter element.

The dual valve can thus be inserted in-line or within the fluid line, utilizing a portion of its open central flow space to accept the reciprocating movement of the two sets of valve elements. The reciprocating valve elements of each valve are each provided with pressure-actuating surfaces, but on opposite sides, so as to be responsive to fluid pressure arising from flow of fluid in opposite directions through the fluid line, one of the valve elements of the each valve being responsive to flow in one direction through the fluid line, and other valve element of the each valve being responsive to flow in the opposite direction through the fluid line.

During flow in one direction, one of the reciprocating valve elements of the first valve under force applied to its forward pressure-actuating surface moves into a first position in which it directs forward flow through one path, such as to a filter. Upon reversal of flow, a pressure-actuating surface responsive to reverse flow on one of the reciprocating valve elements of the second valve receives reverse flow fluid pressure in a manner to move that valve element into an open position, to direct flow through the same path, such as to the filter element.

Similarly, the other reciprocating valve element of the second valve, under a force applied to its forward pressure-actuating surface, moves into a first position in which it allows flow from another fluid path, such as from the other side of the filter element, to proceed. Similarly, upon reversal of flow, a pressure-actuating surface responsive to reverse flow on the other reciprocating valve element of the first valve receives reverse fluid pressure in a manner to move that valve element into an open position to receive flow in the same fluid path, such as from the other side of the filter element. Thus, one of the valve elements of each valve controls flow to the same first line in the same direction, on the same side of the function, such as a filter, and the other valve element of each valve controls flow from the same second but different line, in the same direction, on the other side of the function.

The hydrostat system provided in accordance with the instant invention thus comprises a pump; a motor; a fluid line operatively connecting the pump with the motor and arranged to carry fluid flow therebetween in either direction, a function such as a filter interposed in the fluid line between the pump and the motor for filtration of fluid both in forward flow from the pump to the motor and in reverse flow from the motor to the pump; and a dual coaxial bidirectional flow control valve in fluid-flow-controlling connection with the fluid line between the motor and the pump, and with fluid lines leading to and from the function in series flow connection therewith, one on one side thereof and the other on the other side thereof, the valve directing fluid flow in the same or normal direction through the function via the lines in series flow therewith, regardless of flow direction in the fluid line between the motor and the pump, sensing and responding to fluid pressure arising from the direction of fluid flow to direct both forward and reverse fluid flow in the same or normal direction through the function.

The dual coaxial bidirectional flow-control valve in accordance with the invention comprises, in combination, a valve housing; first and second coaxial tubular flow-control valves in the housing, each having first and second valve seats; first and second valve elements separately reciprocable within the housing between open and closed positions, respectively, against the valve seats; bias means urging the first and second valve elements in one direction; a fluid-pressure-receiving surface operatively connected to each valve element, urging the first valve element in one direction towards or away from its valve seat, and urging the second valve element in the other direction towards or away from its valve seat; the biasing force of the bias means being adjusted to resist movement of each valve element in said direction towards or away from its valve seat under fluid pressure arising from flow applied to the fluid pressure-receiving surface up to a predetermined minimum, and each valve element moving in said direction towards or away from its valve seat and opening a differential fluid pressure arising from flow applied to the fluid pressure-receiving surface above said minimum; one of the first and second valve elements of the first valve being responsive to fluid pressure arising from flow in a first direction and one of the first and second elements of the second valve being responsive to fluid pressure arising from flow in the same direction; the other of the valve elements of the second valve being responsive to fluid pressure arising from flow in the second direction, and the other of the valve elements of the first valve being responsive to fluid pressure arising from flow in the same direction, so that one of the valve elements of the first valve and one of the valve elements of the second valve respond together to fluid pressure arising from flow in one direction, and the other of the valve elements of the second valve and the other of the valve elements of the first valve respond together to fluid pressure arising from the flow in the other direction; first and second flow paths in the housing for connection in series to opposite sides of a function, in fluid flow connection with each other; one of the valve elements of each valve controlling flow from a fluid line to the first fluid path, and the other of the valve elements of each valve controlling flow from a fluid line to the second fluid path.

The filter assemblies provided in accordance with the invention comprise a fluid line arranged to carry fluid flow therethrough in either direction; a filter interposed in the fluid line for filtration of fluid either in forward flow or in reverse flow; and a dual coaxial bidirectional flow control valve in fluid flow connection with the fluid line and with the filter, and interconnected by at least two fluid lines in series flow connection with the filter, one on the upstream side and one on the downstream side of the filter, and controlling flow through the series line to provide for flow in the same direction through the filter from either direction of flow through the fluid line, one coaxial bidirectional flow-control valve directing flow from one direction through the filter in one direction, and the other coaxial bidirectional flow-control valve directing flow from the other direction in the same direction through the filter.

In a preferred embodiment of the invention, the dual coaxial valve has two sets of valve elements that are nested concentrically, and have open centers, and provide for fluid flow in one direction through a fluid path through the open center of the inner tubular valve elements.

Reciprocation of the outer valve elements opens or closes a flow passage extending laterally of the valve elements, through or at one end of the tubular valve housing.

By utilizing the open tubular passage of the valve elements for fluid flow, the dual valves of the invention become capable of passing larger fluid flows at lower pressure drops than other designs of valve.

Because of the coaxial tubular feature, the dual coaxial tubular valves of the invention provide a box junction within a very limited space that is capable of passing fluid flows equal to the capacity of the fluid line in which they are interposed.

A further advantage of the tubular construction is that the valve elements can be light in weight, and reciprocate very quickly between open and closed positions, within several milliseconds.

Sealing means can be provided between the valve elements and the valve housing, to prevent fluid leakage therebetween through the valve. The sealing elements are not essential, and a fluid-tight fit between the valve elements and the tubular valve housing can also be employed, and is preferred, especially at high fluid pressures such as may be encountered in hydrostat systems.

Since each of the valve elements of each valve are normally biased closed when there is no fluid flow, the valve also serves as an antidrain-back valve. The valve prevents drainage of the system when a filter element is being changed, since both the line leading to the filter and the line leading from the filter are closed. Consequently, virtually the only fluid lost during a filter change is the fluid in the filter bowl.

The dual coaxial valves of the invention can be used to control flow through any unidirectional or multidirectional function. By "unidirectional function" is meant any flow-responsive means providing a function through which flow must pass in one direction only in order to realize that function, such as a filter, a flow meter, a fluid system provided with alternative but nonmixed sources of supply, and the like. By "multidirectional function" is meant any flow-responsive means providing a function through which flow may pass in either of two directions in order to realize that function, such as a reversible hydraulic motor, hydraulic cylinder, and the like.

Preferred embodiments of the dual coaxial valve of the invention are shown in the drawings, in which:

FIG. A is a flow diagram showing a box junction with four check valves as previously used to provide flow in the same direction through a filter from either direction of flow in a fluid line;

FIG. B is a flow diagram showing a hydrostat system having a pump and a motor connected in a flow circuit by two fluid lines, with a filter assembly and a dual coaxial valve in the invention in each line, replacing the box junction of FIG. A, so that flow is filtered in each direction in each line between the pump and the motor, and proceeds in the same direction through the filter assembly, regardless of flow direction in the lines;

FIG. C is a flow diagram showing a hydrostat system similar to that of FIG. B but having unidirectional flow to two motors M1 and M2 controlled by a dual coaxial valve of the invention V3 regardless of flow direction in the lines from the pump; and multidirectional flow controlled by four-way valves C1, C2, C3, C4.

FIG. 2 is a cross-sectional view taken along the line 2—2 of FIG. 1 and looking in the direction of the arrows;

Figure 1:
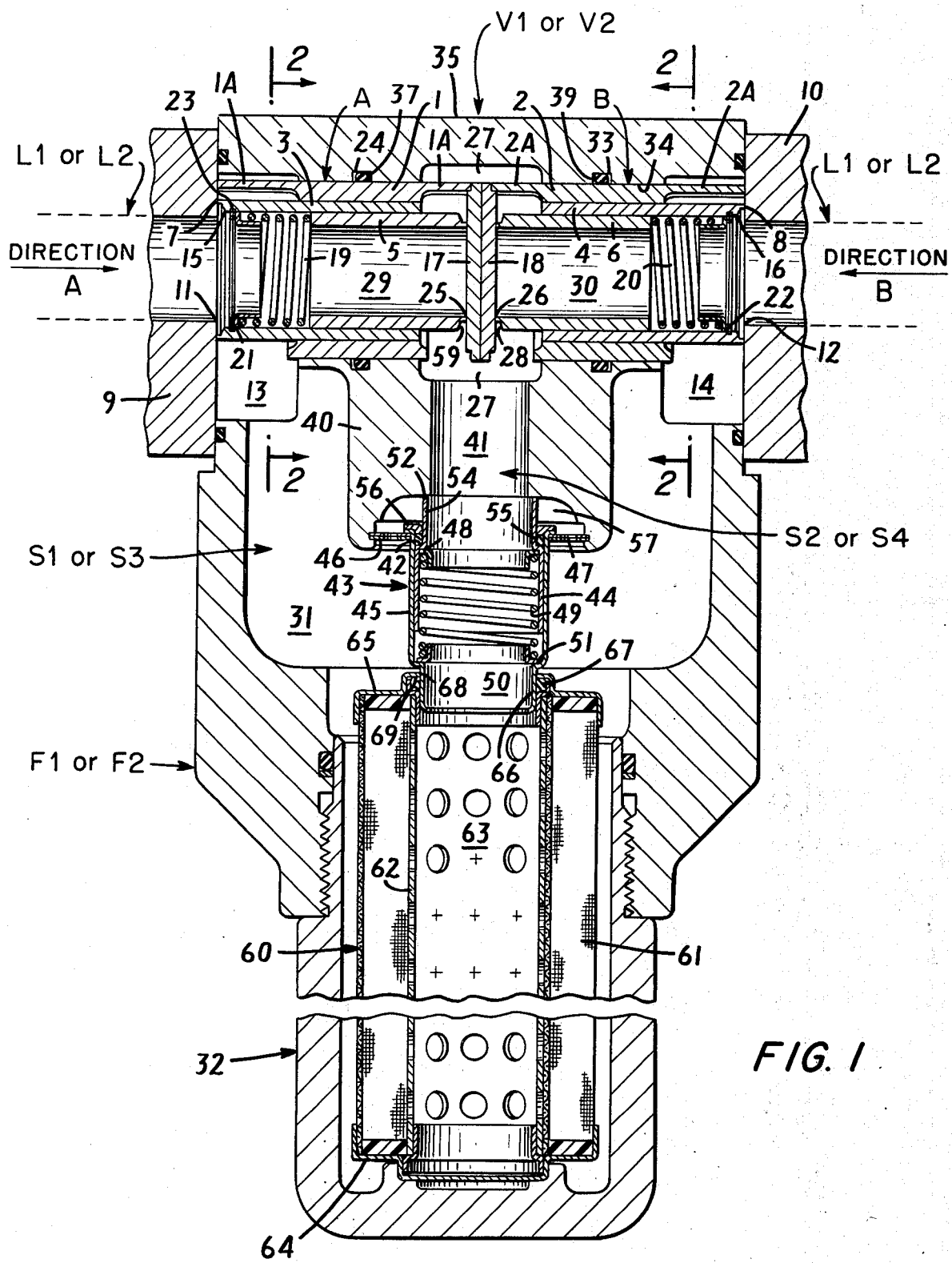
FIG. 1 is a general view in longitudinal section through a filter assembly including a dual coaxial valve in accordance with the invention, in fluid flow connection with the filter element, and showing both valve elements of each valve A and B in the closed position.
Figure 4:
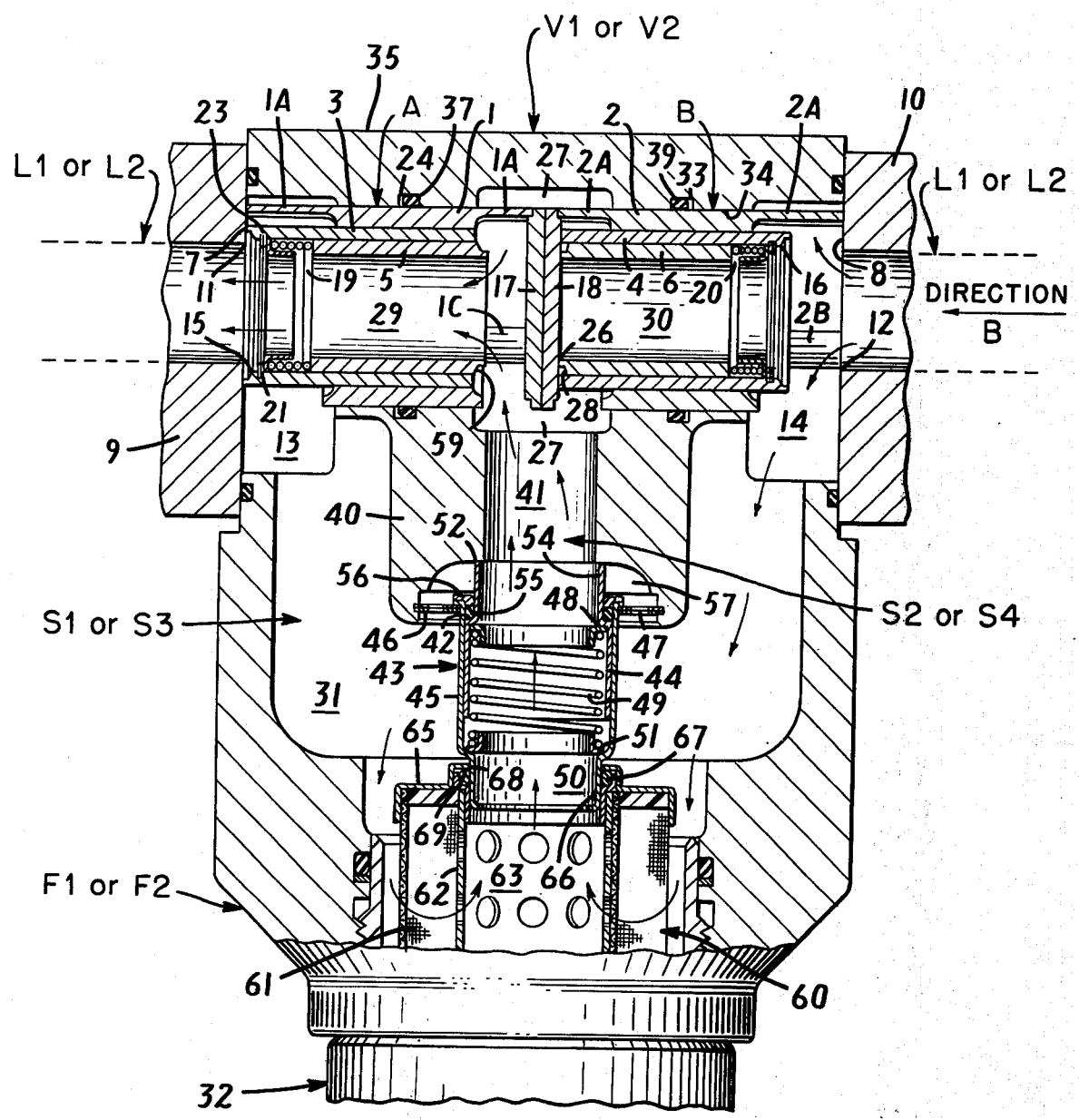

FIG. 3 is a detailed view in longitudinal section of the dual coaxial valve of FIG. 1, showing the outer valve element of valve A and the inner valve element of valve B in the open position, with the other valve elements of each valve in the closed position, for fluid flow in direction A from left to right through the fluid line; and FIG. 4 is a detailed view in longitudinal section of the dual coaxial valve of FIG. 1, showing the inner valve element of valve A in the open position, and the outer valve element of valve B in the open position, with the other valve elements of each valve in the closed position, for fluid flow in direction B, from right to left through the fluid line; and FIG. 5 is a detailed view in longitudinal section of the dual coaxial valve V3 of FIG. C.

The housing for the dual valve can be in one piece, or separate housings for each valve of the dual valve can be interconnected. Since in most instances the valves will be twin valves, facing in opposite directions, it may be convenient to fit each valve individually in the housing. The valves can then be replaced individually when worn. They can also be joined together at opposite ends of any desired module having the fluid flow connections leading to the fluid lines to be connected in the box junction controlled by the dual valve. This permits standardized valve housings for use in any arrangement of a box junction.

The housing has an internal bearing surface or track along which the outer valve elements travel during their reciprocating movement between the open and closed positions. The bearing surface or track can be an internal wall of the housing, along which the valve element can move. Alternatively, a bearing insert or sleeve can be placed within the housing, to serve as the valve element track. Such a surface if porous will be self-lubricating due to the fluid passing through the system filling the pores of the surface or sleeve.

The housing is preferably tubular. For convenience and ease of manufacture, a tubular housing and/or the track are cylindrical, and the tubular valve elements are also cylindrical, and coaxial therewith. However, any other cross-sectional tubular configuration can be used, such as square, triangular, or polygonal. Configurations not round constrain the valve elements to reciprocating movement, and prevent rotation, which is desirable in some systems.

The valve elements have an external configuration matching the bearing surface or track within the tubular housing, for reciprocating movement therealong between their limiting positions. The length of movement of the valve elements is in no way critical, and the bearing surface or track is long enough to accommodate such movement.

Normally, although not necessarily, the valve elements are concentric and tubular, and each has a central passage therethrough for fluid flow to one fluid path. In this form, the dual valve is particularly adapted to fit in the space provided for the fluid line to which it is connected. The open central passage can be closed off, and the flow therefrom to one fluid path through the housing controlled as desired, according to the system requirements, by the inner tubular valve element, which opens to fluid flow only in one direction therethrough. The outer valve element controls flow to another fluid path through the housing.

Each tubular valve element is provided with an annular pressure-receiving surface between two portions of differing diameter, which receives fluid pressure arising from flow on each side thereof. The valve element is operatively connected to the pressure-receiving surface in a manner to be urged when flow begins in one direction, towards either the open or the closed position, as desired, and to move to the other position when flow stops. The pressure-receiving surface should have a pressure-receiving area sufficient to overcome the biasing force of the bias means, and move the valve element in this direction, or vice versa.

Such a pressure surface is usefully formed in a tubular valve element as a ledge or end on the tube extending all or only part of the way around the tube, and leading to a portion of larger or lesser diameter. It is also possible to provide one or more projecting vanes or flanges along the periphery of the valve elements. A sealing element or ring operatively connected to the valve elements at their periphery can serve as a pressure surface.

Normally, the valve elements of each valve are arranged to move in opposite directions to an open position, under the impulse of the pressure-receiving surface, but they can be arranged to move in the same direction.

The paired valve elements of each valve normally move in the same direction in an open position, but they can be arranged to move in opposite directions. When opening, the valve elements of each valve expose different passages, one leading to and one from the function.

The paired valve elements together open the series flow passage through the function. The valve opening can extend over all or part of the circumference of the valve elements, according to the flow required.

The exterior of the valve elements can be made to fit with a close clearance against a bearing surface or track of the tubular housing, or the external valve element of a coaxial pair. The clearance can be sufficiently close so that a leak-tight seal is formed therebetween, preventing leakage past the relief valve.

It is also possible to interpose a sealing element between the exterior of the valve element and the bearing surface or track. Such a sealing element can be fixed to the wall of the tubular housing or to the valve element; in the former it is stationary, and in the latter it reciprocates with the valve element.

One or several bias means is provided, tending to move each valve element towards or away from its valve seat, and opposed to the direction of movement of the valve element under the force applied by fluid pressure at the pressure-receiving surface. A single means biasing both valve elements can be used, or separate bias means for each valve element. The bias means resists movement of the valve element towards or away from its valve seat under fluid pressures arising from flow up to a predetermined minimum; at higher differential fluid pressures; the force applied to the pressure receiving surface exceeds the biasing force of the bias means, and compels movement of the valve element in the opposite direction. In one such direction, the valve element is moved to a closed position, and in the other such direction, the valve element is moved to the open position. Thus, the valve element can be arranged to open or to close under such predetermined fluid pressure.

The bias means can take any form. A compression or tension spring is easily fitted in the central passage of one tubular valve member, or in a recess between the two valve members, without materially obstructing or reducing the open space available for fluid flow. Magnetic elements can also be used, arranged either to attract or to repel one another, one magnetic element being movable with the valve element, and one being in a fixed location in the tubular housing, where it attracts or repels the element towards or away from the valve seat. In all forms, the bias means impels movement of the valve element in a direction opposed to the direction of the application of the actuating fluid pressure on the pressure receiving surface. A combination of spring bias and magnetic bias means can also be used.

It is usually convenient to place the two flow passages to which flow is controlled by the valve elements at one end of or through the tubular housing, extending laterally to the valve elements. If the former, one valve element can be arranged to move towards or away from a valve seat at one end thereof. If the latter, the flow passage is arranged to pass through both the valve elements and the tubular housing, and is opened only upon the registration of apertures at predetermined reciprocable positions of the valve elements with respect to the tubular housing.

The dual coaxial valves of the invention are particularly adapted for use in hydrostat systems to control flow to and from filter assemblies. If the filter element is retained within a filter housing, the valve housing can be attached to or made a part of the filter housing, with the two valves arranged to control flow to the outside and the inside of the filter element. One fluid flow passage in the housing, controlled by one set of the paired valve elements, can open onto one side of the filter element, while the other fluid passage, controlled by the other set of paired valve elements, can open onto the other side of the filter element. Other arrangements are also possible, however. For instance, the dual coaxial valve can be mounted and retained wholly or partially within a tubular filter element, and attached or removed from the filter housing together with the filter element, the filter element being mounted to the housing in conventional manner.

The dual coaxial valves of the invention can be made of any suitable materials, such as plastic or metal. Stainless steel is a particularly durable material of construction, suitable for most uses, especially in filter elements, because of resistance to attack by fluids, and is preferred both for the valve element and for the tubular valve housing and other components of the dual coaxial valve. It is, however, also suitable to make the dual coaxial valve of plastic, such as polytetrafluoroethylene, nylon, polycarbonates, phenol-formaldehyde, urea-formaldehyde, or melamine-formaldehyde resins. It is also suitable to fabricate the valve housing and valve element of stainless steel, and interpose a durable plastic sleeve or insert therebetween as a track, such as, for example polytetrafluoroethylene or nylon.

A particularly advantageous feature of the dual coaxial valves of the invention is that their construction makes it possible to use sheet metal for the tubular housing and internal sleeve, and for the valve elements. This considerably simplifies their fabrication, and reduces manufacturing costs, as compares to other types of valves in which machined, extruded, or cast components are necessary.

A specific and preferred embodiment of the invention is illustrated in the drawings, which will now be described.

The hydrostat system of FIG. B is a typical closed-circuit flow-path system, with a pump P and a motor M interconnected by two fluid lines L1 and L2. Line L1 enters the motor in a position D1, to drive or rotate the motor in one direction, and line L2 enters the motor in an opposite position D2, to drive or rotate the motor in the opposite direction. In one direction, the motor drives the system forward via drive shaft S rotating in one direction. In the opposite direction, the motor drives the system in reverse via drive shaft S rotating in the opposite direction. Thus, fluid pumped by the pump P through the line L1 to the motor M drives the system in one direction, such as forward; the fluid pumped by the pump P through the line L2 to the motor M drives the system in the opposite direction, such as in reverse.

In each line L1 and L2, there is a filter F1 and F2, and a dual coaxial valve of the invention, V1 and V2. The lines S1 and S2 interconnect the filter F1 with the dual valve V1 and the lines S3 and S4 interconnect the filter F2 with the dual valve V2. The valves V1, V2 control flow through the lines S1, S2 and S3, S4 so that flow proceeds through the filters F1, F2 in the same direction, regardless of the direction of flow through the lines L1 and L2. Whether the flow is in the direction from the pump to the motor, or vice versa, in either line L1 or L2, the flow is via lines S1, S2 through the filter F1, and via lines S3, S4 through the filter F2. Since fluid proceeds from the pump to the motor in one line, and returns to the pump in the other line, the flow in each line in each direction is always filtered.

In operation, when flow proceeds forward from the pump to the motor in line L1, the dual valve V1 in response to the resulting fluid pressure in the forward direction opens line S1, and flow proceeds via the filter F1 and line L1 to the motor M. Return flow via the line L2 to dual valve V2 causes the valve V2, in response to the resulting fluid pressure in the return direction, to open line S3 so that return flow proceeds via line S3 through the filter F2 and line S4 and line L2 to the pump.

A reversal of the pump reverses the direction of flow in lines L1, L2, but not the direction of flow through the filters F1 and F2. Flow now proceeds via line L2 to the dual valve V2. In response to the resulting fluid pressure in the forward direction, valve V2 opens line S3 so that flow proceeds via the filter F2 and lines S4 and L2 to the motor. Return flow via line L1 causes dual valve V1 in response to the resulting fluid pressure in the return direction to open line S1, so that flow proceeds through the filter F1 and lines S2 and L1 to the pump.

The dual valves V1, V2 as seen in FIGS. 1 to 4 each comprise two valves, valve A and valve B, and valves A and B in turn comprise a cage sleeve 1, 2 within which reciprocate a pair of concentrically nested outer and inner valve elements 3, 5 (Valve A), and 4, 6 (Valve B). The cage 1, 2 constitutes not only a confining support, but also a track on which the outer elements, 3, 4 move. The first outer tubular valve element 3 of valve A reciprocates along track 1 between open and closed positions, away from and towards a valve seat 7 on cap 9, which carries fluid port 11 and line L1 or L2. The valve element 3 is normally in the closed position, as shown in FIG. 1, but upon moving to the right, to the position shown in FIG. 3, under forward fluid pressure during forward flow in direction A in line L1 or L2 from pump P to motor M, the valve element 3 opens the annular passage 13, leading to the chamber 31 within filter bowl 32.

The second tubular valve element 5 is retained within the first tubular valve element 3 on one side by the disc 17. The disc 17 is fixed to the cage 1, and carries a valve seat 25 for valve element 5.

The other side of valve element 5 is engaged by a compression coil spring 19, which seats against ring 21, held in the wall of valve element 3. The spring 19 biases the element 5 against disc 17, and also biases the element 3 against seat 7 on cap 9. The opening of one of these valve elements thus increases the biasing force of the spring holding the other valve element closed.

The second valve element 5 is free to move within the first outer valve element 3 between positions towards and away from the disc 17, into and away from sealing contact with the valve seat 25 on the surface thereof. The valve element 5 is normally in the closed position, as shown in FIG. 1, but upon moving to the left, to the position shown in FIG. 4 under fluid pressure under reverse flow in direction B through the line L1, or L2, the valve element 5 opens the annular passage 27 leading around the three legs 1A, 1B, 1C of the cage 1 into the open central passage 29 of the valve to the port 11 and line L1 or L2 on the other side of the dual valve.

The outer and inner valve elements 4, 6 of valve B are similar. The first outer element 4 of valve B reciprocates along the track 2 between open and closed positions, towards and away from a valve seat 8 on cap 10. The valve element 4 is normally in the closed position, as shown in FIG. 1, but upon moving to the left, to the position shown in FIG. 4, under reverse fluid pressure during reverse flow in direction B in line L1 or L2 from motor M to pump P, the valve element 4 opens the annular passage 14, leading to the chamber 31 within filter bowl 32.

The second tubular valve element 6 is retained within the first outer tubular valve element 4 on one side by the disc 18. The disc is fixed to the cage 2, and carries a valve seat 26 for valve element 6.

The other side of valve element 6 is engaged by a compression coil spring 20, which seats against ring 22, held in the wall of valve element 4. The spring 20 biases the element 6 against seat 18, and also biases the element 4 against seat 8 on cap 10. The opening of one of these valve elements thus increases the biasing force of the spring holding the other valve element closed.

The second valve element 6 is free to move within the first outer valve element 4 between positions towards and away from the disc 18, into and away from sealing contact with the valve seat 26.

The valve element 6 is normally in the closed position, as shown in FIG. 1, but upon moving to the right, to the position shown in FIG. 3, under fluid pressure under forward flow in direction A through the line L1 or L2, the valve element opens the annular passage 28 leading around the three legs 2A, 2B, 2C, of the cage 2 into the open central passage 30 of the valve to the port 12 and line L1 or L2.

The cages 1, 2 and tubular valve elements 3, 5, 4, 6, are made of stainless steel or alloy steel.

Peripheral grooves 24, 33 in the wall of the bore 34 in the filter head 35 capture O-ring sealing elements 37, 39. The O-rings 37, 39 provide a leak tight seal between the sleeves 1, 2 and the bore 34. The valve elements 3, 5, 4, 6, fit sufficiently tightly together that no sealing element is necessary, since the valve elements are responsive to open upon flow from either direction as soon as it begins.

The filter head 35 has a dependent portion 40 with a central bore 41 in fluid flow connection with passage 27 on one side and with the central passage 50 of a tubular relief valve 43.

The passage 50 opens on one side into the passages 27, 41 in fluid flow connection via the open interiors of valves A, B with the ports 11, 12 of the head 35. To these ports there can be connected the fluid line L1 or L2, as shown in FIG. B.

The relief valve has a tubular valve element 44 which reciprocates within a sleeve 45 fixed to housing portion 40 by a ring 46 having a plurality of apertures 47 therethrough. Seated in a recess 48 formed by turning in one end of element 44 is a coil compression spring 49, the other end of which is seated in a recess 51 in sleeve 45. The spring 49 biases the element 44 against valve seat 52 on housing portion 40 abutting the end of passage 41, and compelling fluid flow through the passage 50 in the open center of the valve 43.

The element 44 has an end portion 54 of lesser diameter than the remaining portion, defining a recess within sleeve 45 within which is captured an O-ring sealing element 55, held there by ring 56.

It will be seen that the ledge 42 between portion 54 and the remaining body portion of element 44 constitutes a pressure-actuating surface, exposed to fluid pressure upstream of the filter 60 in chamber 31, and downstream of the filter 60 in passages 41, 50. Upon reaching a differential pressure between passages 41, 50 and chamber 31 exceeding the biasing force of spring 49, the element 44 is moved away from valve seat 52, exposing a passage 57 bypassing the filter 60.

The filter element 60 is composed of a cylindrical convoluted filter medium 61 supported on a perforated metal core 62 with an open central passage 63, Filtered flow proceeds from chamber 31 or bowl 32 through the filter medium 61 and core 62 into central passage 63. The filter medium and core are confined between end caps 64, 65, of which cap 65 has a central opening 69 receiving one end 66 of sleeve 45, with an O-ring sealing element 67 therebetween to provide a fluid tight seal. The filter 60 is confined within bowl 32 at the other end cap 64, which has no central opening, and is thus positioned in the bowl 32 by sleeve 45.

It will now be seen that the valve passage 13 about the periphery of the first valve element 3 of valve A is in fluid flow connection with the like passage 14 about the exterior of the first valve element 4 of valve B, and both lead to chamber 31. Thus, the first valve elements 3, 4, of each valve A, B, control flow into this passage to the upstream side of the filter element 60.

Similarly, the passage 27 is in fluid flow connection with the open interiors 29, 30, of inner valve elements 5, 6, communicating via passages 41, 50, with the interior of the filter element 60. Thus, the second tubular valve elements 5, 6, of each valve A, B, control the flow of filtered fluid on the downstream side of the filter element 60.

The first valve element 3 of valve A is responsive to fluid flow from left to right through the line L1 or L2 and port 11, and immediately flow begins in this line, proceeding from left to right, it produces a sufficient forward fluid pressure applied to the pressure receiving surface 15 of the valve element 3, which is moved to the right, to the open position shown in FIG. 3, against the biasing force of the spring 19, and held there while such flow continues.

Similarly, upon a sufficient forward fluid pressure in passage 27 applied to the pressure receiving surface 28 on valve element 6, the valve element 6 is moved to the right, to the open position shown in FIG. 3, against the biasing force of the spring 20, and held there while such flow continues.

Thus, in operation with fluid flow in direction A, fluid flow is directed from line L1 or L2 via the annular passage 13 and chamber 31, constituting line S1 or S3 leading to the filter F1 or F2.

After having passed through the filter element 60, fluid flow from the opposite side of the filter element proceeds by way of passages 63, 50, 41, 27, constituting line S2 or S4 leading from the filter to the port 12 and line L1 or L2. Valve elements 5 and 4 are closed. Fluid flow proceeds in direction A through the line L1 or L2 and through the filter F1 or F2 while the pump continues to operate in this direction.

If now the flow of fluid through the line L1 or L2 be reversed, so that it is from right to left, the fluid pressure arising from flow exerted against the tubular valve elements 3, 6, drops to zero, and both valves close under the biasing force of springs 19, 20. Fluid pressure is now exerted in the reverse direction, from right to left, against the fluid pressure receiving surface 16 of the first valve element 4 of valve B, and this valve is driven to the open position shown in FIG. 4, thus opening the annular passage 14, and permitting flow to proceed into the chamber 13 leading to the filter 60 constituting lines S1 or S3 to the filter F1 or F2. After passing through the filter element, flow proceeds through the passages 63, 50, 41, 27, lines S2 or S4, where fluid pressure is exerted against the pressure-receiving surface 59 of the second tubular valve element 5, driving the valve element to the open position shown in FIG. 4 against the biasing force of the spring 19, and opening the flow passage 27 to the interior passage 29, whence flow proceeds through port 11 into the line L1 or L2, still in the reverse direction, from right to left. Flow continues in this direction through the line L1 or L2 while the pump continues to operate in this direction, but flow through the filter element is still in the same or normal direction.

It is thus seen that flow proceeds through the filter assembly in the same direction, regardless of the direction of flow of fluid through the line L1 or L2.

The hydrostat system of FIG. C has provision for either unidirectional or reversible flow through either, both or neither of two motors M1, M2 using a dual coaxial valve of the invention V3 and multiway control valves C1, C2, C3, C4.

The valve V3 provides unidirectional flow from lines L1, L2 through line S5 to motor M1 at D1 and motor M2 at D2, the flow returning via D3, D4 and line S6 to the valve V3. Control valves C1, C2, C3, C4 are set either manually or automatically to close off lines L3, L4 from both motors M1, M2, in this event.

If it be desired that motor M1 be irreversible and motor M2 reversible with reverse flow from pump P in lines L1, L2, control valves C2, C4 are turned so as to close off lines S5, S6 from motor M2, and open lines L3, L4, so that flow to that motor bypasses valve V3, while motor M1 still received unidirectional flow and continues operation in the same direction.

In like manner, motor M1 can be made reversible and motor M2 irreversible by closing control valves C1, C3 so that flow to motor M1 proceeds via lines L3, L4, bypassing the valve V3, while motor M2 continues to receive flow via valve V3 and lines S5, S6.

Finally both motors M1, M2 can be disconnected from valve V3 by control valves C1, C2, C3, C4, so that both are reversible.

Such a system is valuable for controlling reverse and forward drive of a pair of screw propellers for a boat or ship, so that either propeller can be reversible, independently of the other, yet both be operated by a single pump.

Other variations will be apparent to these skilled in this art.

The valve V3 is identical to valves V1, V2, differing only in the fluid lines controlled thereby. Hence, like reference numerals are used in FIG. 5.

It will thus be seen that the valve passage 13 about the periphery of the first valve element 3 of valve A is in fluid flow connection with the fluid line S5, as also is like passage 14 about the exterior of the first valve element 4 of valve B; and both lines lead to the same side of motors M1, M2 at D1, D2 via line S5 and control valves C1, C2. Thus, the first valve elements, 3, 4, of each A, B, control flow into these passages to the same side of the motors M1, M2, according to the positioning of control valves C1, C2.

Similarly, the passage 27 is in fluid flow connection with the open interiors 29, 30, of inner valve elements 5, 6, communicating via line S6 with the other side of motors M1, M2 at D3, D4. Thus, the second tubular valve elements 5, 6, of each valve A, B, control the flow of fluid on the other side of the motors M1, M2, according to the positioning of the control valves C3, C4.

The first valve element 3 of valve A is responsive to fluid flow in direction A (previously filtered en route from the pump P via filter F2) from left to right through the line L2 and port 11, and immediately flow begins in this line, proceeding from left to right, it produces a sufficient forward fluid pressure applied to the pressure receiving surface 15 of the valve element 3, which is moved to the right, to the open position (as shown in FIG. 3), against the biasing force of the spring 19, and held there while such flow continues.

Similarly, upon a sufficient forward fluid pressure in passage 27 applied to the pressure receiving surface 28 on valve element 6, the valve element 6 is moved to the right, to the open position (as shown in FIG. 3), against the biasing force of the spring 20, and held there while such flow continues.

Thus, in operation with fluid flow in direction A, fluid flow is directed from line L2 via the annular passage 13 and line S5, leading to the motors M1, M2.

After having passed through the motors M1, M2, fluid flow from the opposite side of the motors proceeds by way of line S6 leading from the motors to the passage 27, port 12 and line L1. Valve elements 5 and 4 are closed. Fluid flow proceeds in direction A through the line L1 and through the filter F1, while the pump continues to operate in this direction.

If now the flow of fluid through the lines L1, L2 be reversed, so that it is from right to left, in direction B, the fluid pressure arising from flow exerted aginst the tubular valve elements 3, 6, drops to zero, and both valves close under the biasing force of springs 19, 20. Fluid pressure is now exerted in the reverse direction, from right to left, against the fluid pressure receiving surface 16 of the first valve element 4 of valve B, and this valve is driven to the open position shown in FIG. 5, thus opening the annular passage 14, and permitting flow to proceed into line S5 leading to the motors M1, M2, in the same direction as before. After passing through the motors M1, M2, flow proceeds through line S6 to passage 27, where fluid pressure is exerted against the pressure receiving surface 59 of the second tubular valve element 5, driving the valve element to the open position shown in FIG. 5 against the biasing force of the spring 19, and opening the flow passage 27 to the interior passage 29, whence flow proceeds through port 11 into the line L2, still in the reverse direction B, from right to left. Flow continues in this direction through the line L2 while the pump continues to operate in this direction, but flow through the motors M1, M2 is still in the same or normal direction.

It is thus seen that flow proceeds through the motors in fluid flow connection to valve V3 in the same direction, regardless of the direction of flow of fluid through the line L1 or L2.

However, reversible operation of either or both of motors M1, M2 can be obtained whenever desired by operation of control valves C1, C2, C3, C4 to cut the fluid connection to valve V3, and put the motor in direct flow connection to the lines L3, L4. Thus, complete flexibility in simultaneous reverse or forward operation of neither, both or either motor M1, M2 is obtained, and this can be fully automatic, if desired.

The valve of the invention is useful as a normally closed dual check valve in any fluid system where flow in any line can proceed in either of two directions. While the use of the valve has been described particularly with reference to a hydrostat system, it can be used in other dual flow systems, such as in dead end circuits, as in aircraft brake systems and brake systems for other vehicles.

Having regard to the foregoing disclosure, the following is claimed as the inventive and patentable embodiments thereof:

1. A filter assembly comprising, in combination, a fluid line arranged for fluid flow therethrough in either of two directions; a filter element in fluid flow connection with the fluid line, so that flow through the line in at least one direction must pass through the filter element; the filter element having a filter sheet arranged in a closed configuration about the internal passage, with end caps across the ends of the internal passage attached to the filter sheet, at least one of the end caps having an aperture therethrough in fluid flow connection with the internal passage; and a dual coaxial bidirectional flow control valve in fluid flow connection with the fluid line and the filter element and responsive to differential fluid pressure thereacross arising from flow of fluid in either direction through the line and a valve flow passage to direct flow through the filter in the same direction, comprising a tubular valve housing; first and second valves in the housing, each having first and second coaxial tubular valve elements nested concentrically and separately reciprocable within the valve housing towards and away from first and second valve seats, respectively, between closed and open positions, to close and open first and second flow passages, respectively; one of the first and second valve elements of each valve controlling flow to or from one flow passage, and the other valve element of each valve controlling flow to or from the other flow passage; bias means urging the valve elements in one direction; and a fluid-pressure-receiving surface operatively connected to each valve element, urging the first valve element in a first direction towards or away from its valve seat, and a second valve element in a second direction towards or away from its valve seat; the biasing force of the bias means being adjusted to resist movement of each valve element in said direction away from or towards its valve seat except under differential fluid pressure arising from flow and applied to the fluid pressure receiving surface from one of the flow directions, and each of the valve elements moving in said direction towards or away from its valve seat and opening when flow begins from that flow direction and closing when flow stops from that flow direction; one of the valve elements of the first valve and one of the valve elements of the second valve being responsive to fluid pressure arising from flow in one direction from one side of the valve, and the other of the valve elements of the first valve and the other of the valve elements of the second valve being responsive to fluid pressure arising from flow in another direction from the other side of the valve, so that the valve is arranged to open or close in response to fluid pressure arising from flow and applied from either direction of flow and to direct flow entering the valve from one fluid line from either direction to one of the first and second flow passages, and to direct flow leaving the valve via the other of the flow passages to the one fluid line for flow in either direction, and direct flow through the filter in the same direction.

2. A filter assembly in accordance with claim 1, having a filter sheet arranged in a closed configuration about a central passage, and supported upon an internal core having an open internal passage.

3. A filter assembly in accordance with claim 2, in which the coaxial valve is disposed across passages leading to the exterior and interior of the filter element, and fluid flow through such passages is controlled by the valve.

4. A filter assembly in accordance with claim 1, comprising a housing within which are disposed both the filter element and the coaxial valve; the coaxial valve being inserted in a bore in the housing, and the filter element being attached to the housing in fluid flow connection with the bore controlled by the valve.

5. A hydrostat system comprising a hydraulic pump, a hydraulic motor, a fluid line operatively connecting the pump with the motor, and arranged to carry fluid flow therebetween in either direction; a filter interposed in the fluid line between the pump and the motor, for filtration of fluid in either direction of flow from the pump to the motor; and a dual coaxial bidirectional flow control valve in fluid flow-controlling connection with the fluid line and with fluid lines in series flow connection to and from the filter, and responsive to differential fluid pressure thereacross arising from flow of fluid in either direction through the fluid line and a valve flow passage in series with the filter to direct flow through the filter in the same direction, comprising a tubular valve housing; first and second valves in the housing, each having first and second coaxial tubular valve elements nested concentrically and separately reciprocable within the valve housing towards and away from first and second valve seats, respectively, between closed and open positions, to close and open first and second valve flow passages, respectively; one of the first and second valve elements of each valve controlling flow to or from one valve flow passage, and the other valve element of each valve controlling flow to or from the other valve flow passage; bias means urging the valve elements in one direction; and a fluid-pressure-receiving surface operatively connected to each valve element, urging the first valve element in a first direction towards or away from its valve seat, and a second valve element in a second direction, towards or away from its valve seat; the biasing force of the bias means being adjusted to resist movement of each valve element in said direction away from or towards its valve seat except under different fluid pressure arising from flow and applied to the fluid-pressure-receiving surface from one of the flow directions, and each of the valve elements moving in said direction towards or away from its valve seat and opening when flow begins from that direction and closing when flow stops from that flow direction; one of the valve elements of the first valve and one of the valve elements of the second valve being responsive to fluid pressure arising from flow in one direction from one side of the valve and the other of the valve elements of the first valve and the other of the valve elements of the second valve being responsive to fluid pressure arising from flow in another direction from the other side of the valve, so that the valve is arranged to open or close in response to fluid pressure arising from flow and applied from either direction of flow and to direct flow entering the valve from one fluid line from either direction to one of the first and second flow passages, and to direct flow leaving the valve via the other of the flow passages to the one fluid line for flow in either direction and direct flow through the filter in the same direction.

6. A hydrostat system according to claim 5, in which the dual coaxial valve has two valve elements which are light in weight and reciprocate between open and closed positions within several milliseconds.

7. A hydrostat system in accordance with claim 6 in which the valve elements are concentrically nested, and the inner element has an open central passage for flow of fluid therethrough.

8. A hydrostat system in accordance with claim 7 in which the first and second valves are twin valves facing in opposite directions.

9. A hydrostat system comprising a hydraulic pump; at least one hydraulic motor; a fluid line operatively connecting the pump with each motor, and arranged to carry fluid flow therebetween in either direction; a filter interposed in the fluid line between the pump and the motor, for filtration of fluid in at least one direction of flow from the pump to the motor; and a dual coaxial bidirectional flow control valve in fluid flow-controlling connection with the fluid line and with fluid lines in series flow connection to and from the motor, and responsive to differential fluid pressure thereacross arising from flow of fluid in either direction through the fluid line and a valve flow passage in series with the motor, to direct flow through the motor in the same direction, comprising a tubular valve housing, first and second valves in the housing, each having first and second coaxial tubular valve elements nested concentrically and separately reciprocable within the valve housing towards and away from first and second valve seats, respectively, between closed and open positions, to close and open first and second flow passages, respectively; one of the first and second valve elements of each valve controlling flow to or from one valve flow passage, and the other valve element of each valve controlling flow to or from the other valve flow passage; bias means urging the valve elements in one direction; and a fluid-pressure-receiving surface operatively connected to each valve element, urging the first valve element in a first direction towards or away from its valve seat, and a second valve element in a second direction, towards or away from its valve seat; the biasing force of the bias means being adjusted to resist movement of each valve element in said direction away from or towards its valve seat except under differential fluid pressure arising from flow and applied to the fluid pressure-receiving surface from one of the flow directions, and each of the valve elements moving in said direction towards or away from its valve seat and opening when flow begins from that direction and closing when flow stops from that flow direction; one of the valve elements of the first valve and one of the valve elements of the second valve being responsive to fluid pressure arising from flow in one direction from one side of the valve, and the other of the valve elements of the first valve and the other of the valve elements of the second valve being responsive to fluid pressure arising from flow in another direction from the other side of the valve, so that the valve is arranged to open or close in response to fluid pressure arising from flow and applied from either direction of flow and to direct flow entering the valve from one fluid line from either direction to one of the first and second flow passages, and to direct flow leaving the valve via the other of the flow passages to the one fluid line for flow in either direction, and direct flow through the motor in the same direction.

10. A hydrostat system according to claim 9, in which the dual coaxial valve has two valve elements which are light in weight and reciprocate between open and closed positions within several milliseconds.

11. A hydrostat system in accordance with claim 9 in which the valve elements are concentrically nested, and the inner element has an open central passage for flow of fluid therethrough.

12. A hydrostat system in accordance with claim 11 in which the first and second valves are twin valves facing in opposite directions.

13. A hydrostat system comprising a hydraulic pump; at least one hydraulic motor; a fluid line operatively connecting the pump with each motor, and arranged to carry fluid flow therebetween in either direction; a filter interposed in the fluid line between the pump and the motor, for filtration of fluid in at least one direction of flow from the pump to the motor; and two dual coaxial bidirectional flow control valves, of which valves one is in fluid flow-controlling connection with the fluid line and with fluid lines in series flow connection to and from the motor, and responsive to differential fluid pressure thereacross arising from flow of fluid in either direction through the fluid line and a valve flow passage in series with the motor, to direct flow through the motor in the same direction, and the second valve is in fluid flow-controlling connection with the fluid line and with fluid lines in series flow connection to and from the filter, and responsive to differential fluid pressure thereacross arising from flow of fluid in either direction through the fluid line and a valve flow passage in series with the filter, to direct flow through the filter in the same direction; each dual coaxial bidirectional flow control valve comprising a tubular valve housing; first and second valves in the housing, each having first and second coaxial tubular valve elements nested concentrically and separately reciprocable within the valve housing towards and away from first and second valve seats, respectively, between closed and open positions, to close and open first and second flow passages, respectively; one of the first and second valve elements of each valve controlling flow to or from one valve flow passage, and the other valve element of each valve controlling flow to or from the other valve flow passage; bias means urging the valve elements in one direction; and a fluid-pressure-receiving surface operatively connected to each valve element, urging the first valve element in a first direction towards or away from its valve seat, and a second valve element in a second direction, towards or away from its valve seat; the biasing force of the bias means being adjusted to resist movement of each valve element in said direction away from or towards its valve seat except under differential fluid pressure arising from flow and applied to the fluid pressure-receiving surface from one of the flow directions, and each of the valve elements moving in said direction towards or away from its valve seat and opening when flow begins from that direction and closing when flow stops from that flow direction; one of the valve elements of the first valve and one of the valve elements of the second valve being responsive to fluid pressure arising from flow in one direction from one side of the valve, and the other of the valve elements of the first valve and the other of the valve elements of the second valve being responsive to fluid pressure arising from flow in another direction from the other side of the valve, so that the valve is arranged to open or close in response to fluid pressure arising from flow and applied from either direction of flow and to direct flow entering the valve from one fluid line from either direction to one of the first and second flow passages, and to direct flow leaving the valve via the other of the flow passages to the one fluid line for flow in either direction, and direct flow through the motor or filter in the same direction.

* * * * *

UNITED STATES PATENT OFFICE
CERTIFICATE OF CORRECTION

Patent No. 3,985,652          Dated October 12, 1976

Inventor(s) Roydon B. Cooper

It is certified that error appears in the above-identified patent and that said Letters Patent are hereby corrected as shown below:

Column 1, line 57   :   "forward" should be in quotes --"forward"--.

Column 1, line 57   :   "is" should be --as--.

Column 14, line 65  :   "aginst" should be --against--.

Column 17, line 10  :   "different" should be -- differential--.

Signed and Sealed this

Twenty-second Day of February 1977

[SEAL]

Attest:

RUTH C. MASON
*Attesting Officer*

C. MARSHALL DANN
*Commissioner of Patents and Trademarks*